United States Patent [19]

Raisin et al.

[11] 4,402,704
[45] Sep. 6, 1983

[54] PROCESS FOR TRICHROMATIC DYEING OR PRINTING

[75] Inventors: Helmut Raisin, Riehen; Dieter Mäusezahl, Biel-Benken, both of Switzerland; Harry Schaetzer, Wehr, Fed. Rep. of Germany

[73] Assignee: Ciba-Geigy Corporation, Ardsley, N.Y.

[21] Appl. No.: 346,978

[22] Filed: Feb. 8, 1982

[30] Foreign Application Priority Data

Dec. 29, 1981 [CH] Switzerland ............ 8344/81

[51] Int. Cl.³ .................... C09B 1/00; C09B 29/00
[52] U.S. Cl. ................................ 8/641; 8/643; 8/676; 8/680; 8/683; 8/917; 8/924
[58] Field of Search ............... 8/641, 643, 680, 683, 8/917, 924, 929, 676

[56] References Cited

U.S. PATENT DOCUMENTS 3,778,453 12/1973 Hindermann et al. ............ 260/374
3,932,378 1/1976 Fasciati ............................ 8/681
4,312,808 1/1982 Lienhard et al. ................. 260/198

FOREIGN PATENT DOCUMENTS 1396126 6/1975 United Kingdom.
2069542 8/1981 United Kingdom.

*Primary Examiner*—A. Lionel Clingman
*Attorney, Agent, or Firm*—Edward McC. Roberts

[57] ABSTRACT

The invention relates to a process for the trichromatic dyeing or printing of natural and synthetic polyamide materials with dye mixtures, in which process there is used the dye of the formula

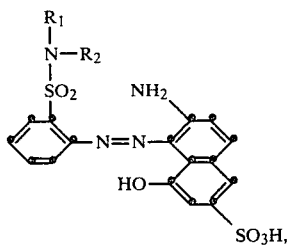

wherein $R_1$ is methyl or ethyl, and $R_2$ is cyclohexyl or phenyl, together with at least one dye of the formula

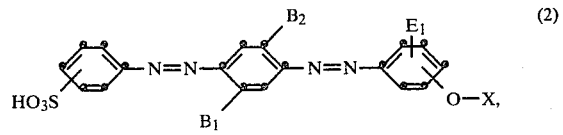

wherein $B_1$, $B_2$ and $E_1$ are hydrogen, $C_1$–$C_4$-alkyl or $C_1$–$C_4$-alkoxy, and X is straight-chain or branched-chain $C_1$–$C_4$-alkyl, or straight-chain or branched-chain $C_2$–$C_4$-hydroxyalkyl, and a dye of the formula

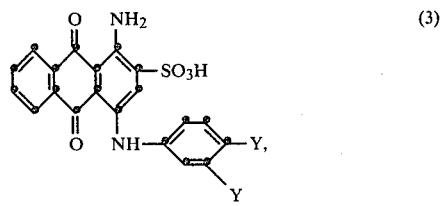

wherein one Y is hydrogen or methyl, and the other Y is $C_2$–$C_4$-alkanoylamino or $C_2$–$C_4$-hydroxyalkylsulfamoyl, or with a mixture of the dyes of the formulae

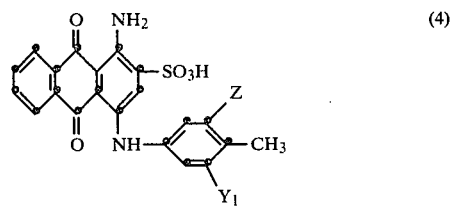

and

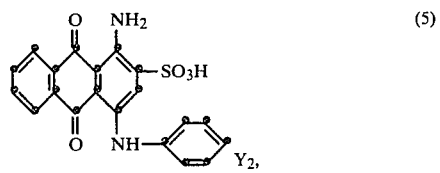

where $Y_1$ in the formula (4) is $C_2$–$C_4$-hydroxyalkylsulfamoyl, and Z is hydrogen or methyl, and $Y_2$ in the formula (5) is $C_2$–$C_4$-alkanoylamino, Z in the formula (4) being hydrogen when $Y_2$ in the formula (5) is the propionyl amino group in the m-position with respect to the NH group.

The process according to the invention is suitable for dyeing natural or synthetic polyamide materials from an aqueous liquor, or for printing with printing pastes; and it is particularly suitable for dyeing from short liquors.

24 Claims, No Drawings

PROCESS FOR TRICHROMATIC DYEING OR PRINTING

It was the object of the present invention to provide a process for dyeing or printing natural and synthetic polyamide materials with dyes suitable for combination according to the trichromatic principle. The dyes to be used in the process should be able to give a uniform colour build-up with simultaneous constancy of shade at various concentrations, and be suitable for combination.

It has now been found that the process described in the following meets the stated requirements.

The present invention thus relates to a process for the trichromatic dyeing or printing of natural and synthetic polyamide materials with dye mixtures, in which process there is used a dye of the formula

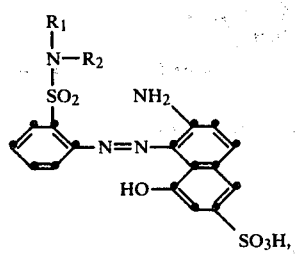 (1)

wherein $R_1$ is methyl or ethyl, and $R_2$ is cyclohexyl or phenyl, together with at least one dye of the formula

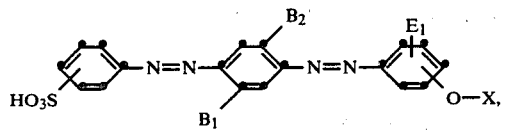 (2)

wherein $B_1$, $B_2$ and $E_1$ are hydrogen, $C_1$–$C_4$-alkyl or $C_1$–$C_4$-alkoxy, and X is straight-chain or branched-chain $C_1$–$C_4$-alkyl, or straight-chain or branched-chain $C_2$–$C_4$-hydroxy-alkyl, and a dye of the formula

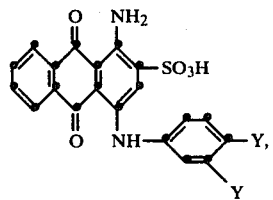 (3)

wherein one Y is hydrogen or methyl, and the other Y is $C_2$–$C_4$-alkanoylamino or $C_2$–$C_4$-hydroxyalkylsulfamoyl, or with a mixture of the dyes of the formulae

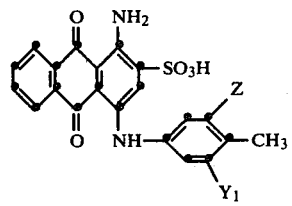 (4)

and

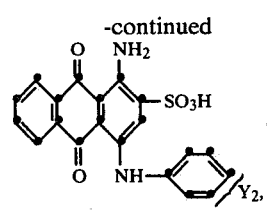 (5)

where $Y_1$ in the formula (4) is $C_2$–$C_4$-hydroxyalkylsulfamoyl, and Z is hydrogen or methyl, and $Y_2$ in the formula (5) is $C_2$–$C_4$-alkanoylamino, Z in the formula (4) being hydrogen when $Y_2$ in the formula (5) is the propionyl amino group in the m-position with respect to the NH group.

By trichromatic dyeing is meant the additive dye mixture of suitably selected yellow- or orange-, red- and blue-dyeing dyes, with which any desired shade of the visible colour spectrum can be obtained by suitable choice of the quantitative ratios of the dyes.

$B_1$, $B_2$, $E_1$ and X as alkyl groups in the formula (2) are independently of one another straight-chain or branched-chain alkyl groups. Examples of $B_1$, $B_2$, $E_1$ and X which may be mentioned are: methyl, ethyl, propyl, isopropyl, butyl, sec-butyl, isobutyl and tert-butyl.

Alkoxy groups denoted by $B_1$, $B_2$ and $E_1$ in the formula (2) are for example: the methoxy, ethoxy, propoxy, isopropoxy, butoxy, sec-butoxy, isobutoxy and tert-butoxy groups.

X as a hydroxyalkyl group in the formula (2) is a straight-chain or branched-chain hydroxyalkyl group, such as the β-hydroxyethyl, β-hydroxypropyl, β-hydroxybutyl group or the α-ethyl-β-hydroxyethyl group.

As a $C_2$–$C_4$-alkanoylamino group, Y in the formula (3) or $Y_2$ in the formula (5) is for example: the acetylamino, propionylamino or butyrylamino group.

A $C_2$–$C_4$-hydroxyalkylsulfamoyl group denoted by Y in the formula (3) or by $Y_1$ in the formula (4) is for example: the β-hydroxyethylsulfamoyl, β-hydroxypropylsulfamoyl, γ-hydroxypropylsulfamoyl or β-hydroxybutylsulfamoyl group.

Important process variations are characterised in that a dye of the formula (1) is used together with at least one dye of the formula (2) and (a) with a dye of the formula

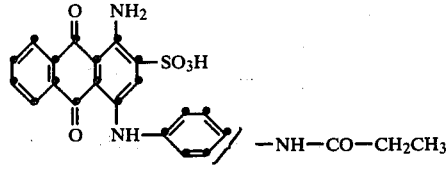 (6)

or with a mixture of the dyes of the formulae

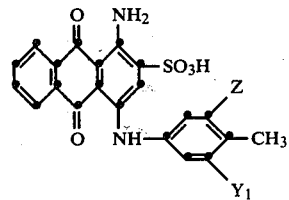 (4)

and

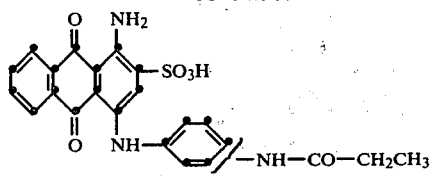
(6)

wherein $Y_1$ and Z in the formula (4) have the meanings defined in the foregoing, Z in the formula (4) being hydrogen when the propionylamino group in the formula (6) is bound in the m-position with respect to the NH group, or (b) with a dye of the formula

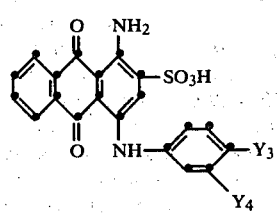
(7)

wherein $Y_3$ is hydrogen, and $Y_4$ is acetylamino, or wherein $Y_3$ is methyl and $Y_4$ is $C_2$–$C_4$-hydroxyalkylsulfamoyl, or (c) with a dye mixture containing a dye of the formula

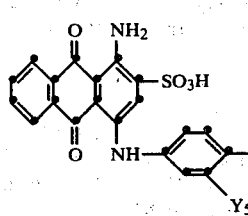
(8)

wherein $Y_5$ is a $C_2$–$C_4$-hydroxyalkylsulfamoyl group, and a dye of the formula

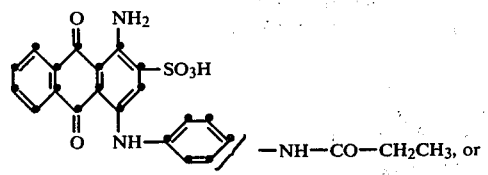
(6)

(d) with a dye mixture containing a dye of the formula

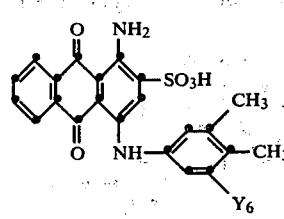
(9)

wherein $Y_6$ is a $C_2$–$C_4$-hydroxyalkylsulfamoyl group, and a dye of the formula

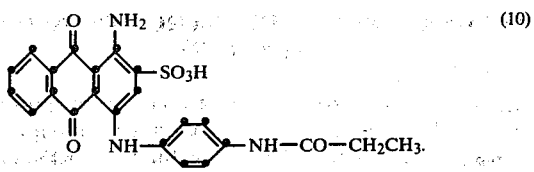
(10)

The preferred process variants are characterised in that a dye of the formula (1) is used together with at least one dye of the formula (2) and (e) with a dye mixture containing the dye of the formula

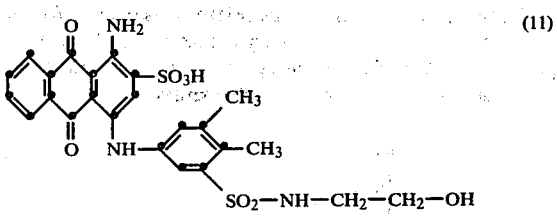
(11)

and the dye of the formula

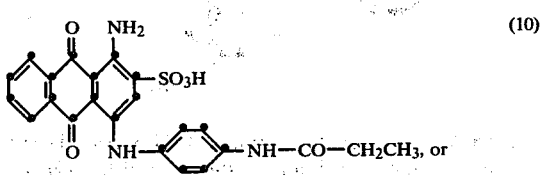
(10)

(f) with the dye of the formula

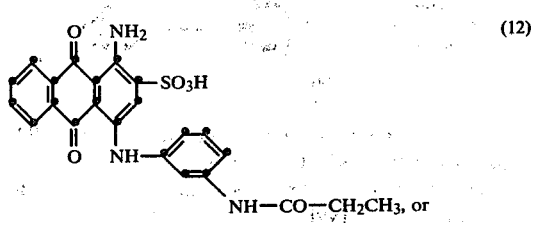
(12)

(g) with the dye of the formula (10), or
(h) with the dye of the formula

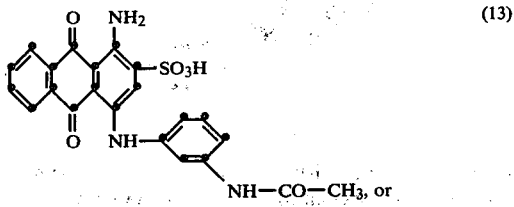
(13)

(i) with the dye of the formula

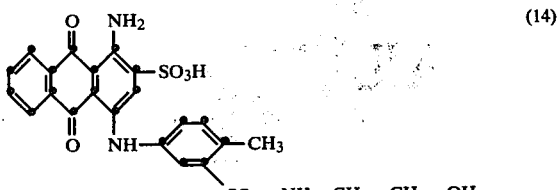
(14)

In the process variations where a dye mixture of the dyes of the formulae (8) and (6), (9) and (10) or (11) and (10) is used, the ratio between the dyes of the formulae (8) and (6), (9) and (10) or (11) and (10) is preferably 60:40 to 40:60.

In the above-described process variants, preferred dyes as dyes of the formula (1) are those of the formulae

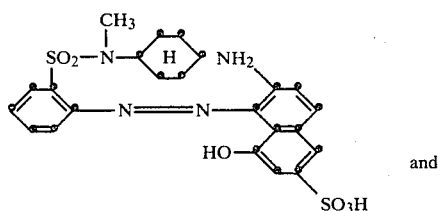 (15)

and

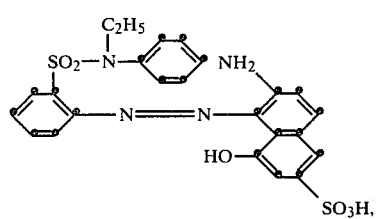 (16)

and preferred dyes as dyes of the formula (2) are those of the formula

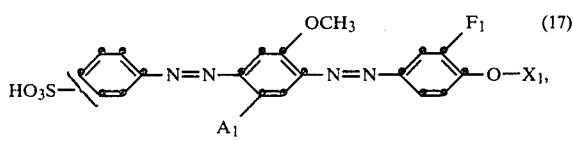 (17)

wherein $A_1$ is hydrogen or methyl, $F_1$ is hydrogen or methyl, and $X_1$ is methyl, ethyl, β-hydroxyethyl, β-hydroxypropyl, β-hydroxybutyl or α-ethyl-β-hydroxyethyl.

Preferred as dyes of the formula (2) are in particular the dyes of the formulae

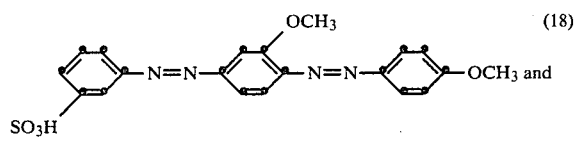 (18)

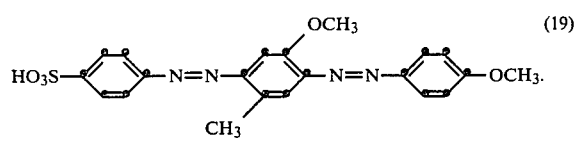 (19)

The more especially preferred process variants are characterised in that the dye of the formula (15) is used together with the dye of the formula

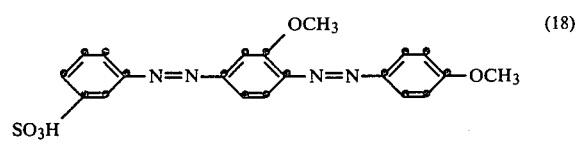 (18)

and with either one of the dyes of the formulae (13) or (14), or with a dye mixture of the dyes of the formulae (11) and (10) or (14) and (12) in the ratio of 60:40 to 40:60.

A likewise more especially preferred process variant is characterised in that the dye of the formula (15) is used together with the dye of the formula

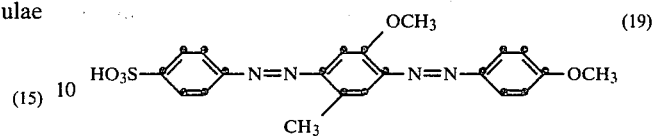 (19)

and with a dye mixture of the dyes of the formulae (11) and (10) in the ratio of 60:40 to 40:60.

The dyes used in the process according to the invention for trichromatic dyeing or printing are known, or they can be produced by methods analogous to known methods. Thus, for example, the dyes of the formula (1) can be produced according to the data from the German patent specifications Nos. 702932 and 2063907; the dyes of the formula (2) according to data from the German Offenlegungsschrift No. 2,142,412; and the dyes of the formulae (3), (4) and (5) according to data from the U.S. patent specification No. 3,778,453, or by methods analogous to those described in the German patent specifications Nos. 945,643 and 538,310.

If dye mixtures of the dyes of the formula (2) or of the formulae (4) and (5) are used in the process according to the invention, these mixtures can be prepared by mixing together the individual dyes. The mixing process can be carried out for example in suitable mills, such as ball mills and dowelled-disc mills, and also in kneaders or mixers. The dye mixtures of the dyes of the formula (2) or of the formulae (4) and (5) can also be produced by spray drying of the aqueous dye mixtures.

The dyes used in the process according to the invention are either in the form of their free sulfonic acid or preferably in the form of salts thereof. Suitable salts are for example the alkali metal, alkaline-earth metal or ammonium salts, or the salts of an organic amine. Examples which may be mentioned are the sodium, lithium, potassium or ammonium salts, or the salt of triethanolamine.

The dye mixtures used in the process according to the invention contain as a rule further additives, for example sodium chloride or dextrin.

The process according to the invention for trichromatic dyeing or printing can be performed by customary dyeing and printing methods. The dye liquors or printing pastes can contain, in addition to water and the dyes, further additives, for example: wetting agents, antifoaming agents, levelling agents or agents affecting the properties of the textile material, for example softening agents, additives for imparting a fireproof finish, or dirt-, water- and oil-repelling agents, as well as water-softening agents and natural or synthetic thickeners, for example alginates and cellulose ethers.

The process according to the invention is particularly suitable for dyeing from short liquors, for example in continuous dyeing processes or in discontinuous and continuous forth-dyeing processes.

The dyes used in the process according to the invention are characterised, in the case of trichromatic dyeing or printing, by a uniform colour build-up, by good strike properties, by good constancy of shade, also at various concentrations, by good fastness properties and, in particular, by a very high degree of suitability for being combined with other dyes.

The process according to the invention is suitable for dyeing or printing both natural polyamide materials, for example wool, and in particular synthetic polyamide materials, such as Perlon or nylon; and it is suitable also for dyeing or printing wool and synthetic polyamide mixed fabrics or yarns.

The stated textile materials can be in the most varied stages of processing: for example in the form of fibres, yarns, fabrics or knitted goods, and especially in the form of carpets.

The term 'parts' in the following Examples denotes parts by weight, and temperature values are given in degrees Centigrade. The relationship between parts by weight and parts by volume is the same as that between gram and cubic centimeter.

EXAMPLE 1

To produce the dye mixture containing a dye of the formula

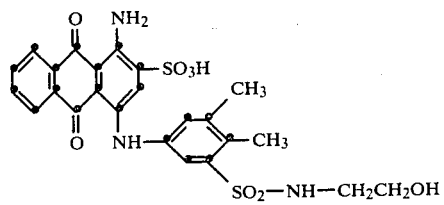

and a dye of the formula

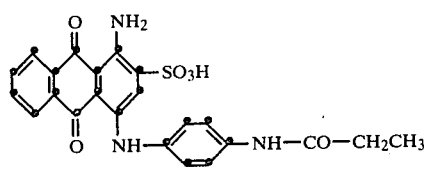

the following operations are carried out in a mixer:
(a) 30.2 parts of the dye of the formula (11) and 69.8 parts of the dye of the formula (10) are homogeneously mixed to obtain 100 parts of the mixture denoted in the following as dye mixture A;
(b) 56.6 parts of the dye of the formula (11) and 43.4 parts of the dye of the formula (10) are homogeneously mixed to obtain 100 parts of the mixture denoted in the following as dye mixture B;
(c) 79.6 parts of the dye of the formula (11) and 20.4 parts of the dye of the formula (10) are homogeneously mixted to obtain 100 parts of the mixture denoted in the following as dye mixture C.

EXAMPLE 2

10 parts of Helanca tricot are dyed in 500 parts of an aqueous liquor containing per liter 2 g of ammonium acetate, the pH-value of the liquor having been adjusted to 5 with acetic acid. The dyes used are 0.27% of the yellow dye of the formula

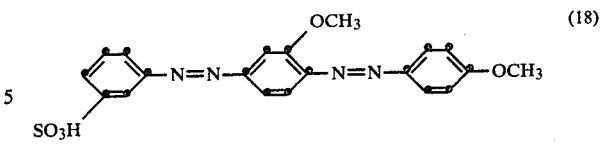

0.12% of the red dye of the formula

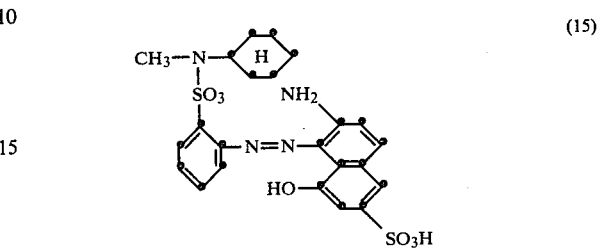

and 0.13% of the blue dye mixture B obtained according to Example (1b), the percentage amounts being relative to the weight of fibre. The dyeing time at a temperature of 98° C. is 30 to 90 minutes. The dyed Helanca piece is subsequently removed and is rinsed and dried in the usual manner. The fabric piece obtained is completely evenly dyed in a neutral brown shade and exhibity no sign at all of streakiness induced by the material.

By using, instead of 0.27% of the yellow dye of the formula (18) and 0.12% of the red dye of the formula (15) with 0.13% of the blue dye mixture B, the dyes of the formulae (18) and (15) together with the dye mixtures from Example 1 which are given in the following Table 1, there are obtained fabric pieces completely evenly dyed in the shades indicated.

TABLE 1

| Example | Dyes used | Shade |
| --- | --- | --- |
| 3 | 0.18% of the dye of formula (18) 0.18% of the dye of formula (15) 0.077% of the dye mixture C | reddish-brown |
| 4 | 0.25% of the dye of formula (18) 0.04% of the dye of formula (15) 0.14% of the dye mixture A | olive |

EXAMPLE 5

10 parts of polyamide 66 yarn are dyed in 400 parts of an aqueous liquor containing per liter 1.5 g of ammonium acetate, the pH-value of the liquor having been adjusted to 5.5 with acetic acid. The dyes used are 0.27% of the dye of the formula (18), 0.12% of the dye of the formula (15) and 0.13% of the dye mixture B obtained according to Example 1b), the percentage amounts being relative to the weight of fibre. The dye bath is heated within 30 minutes to 98° C., and is held for 60 minutes at 96° C. to 98° C. The dyed yarn is subsequently removed, and is rinsed and dried in the customary manner. The result is a yarn dyed in a neutral brown shade.

By using, instead of 0.27% of the yellow dye of the formula (18) and 0.12% of the red dye of the formula (15) with 0.13% of the blue dye mixture B, the dyes of the formulae (18) and (15) together with the dye mixtures from Example 1 which are given in the following Table 2, there is obtained yarn dyed in the shades indicated.

TABLE 2

| Example | Dyes used | Shade |
|---|---|---|
| 6 | 0.18% of the dye of formula (18)<br>0.18% of the dye of formula (15)<br>0.077% of the dye mixture C | reddish-brown |
| 7 | 0.25% of the dye of formula (18)<br>0.05% of the dye of formula (15)<br>0.14% of the dye mixture A | olive |

By using moreover, instead of the yellow dye of the formula (18), the orange dye of the formula

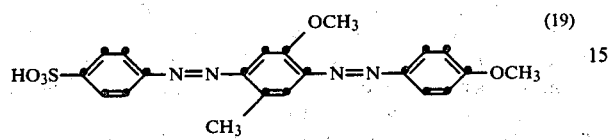

together with the red dye of the formula (15) and the dye mixtures from Example 1, there is obtained, with the dyes given in the following Table 3, the yarn dyed in the shades listed in the Table.

TABLE 3

| Example | Dyes used | Shade |
|---|---|---|
| 8 | 0.2% of the dye of formula (19)<br>0.1% of the dye of formula (15)<br>0.14% of the dye mixture B | neutral brown |
| 9 | 0.18% of the dye of formula (19)<br>0.12% of the dye of formula (15)<br>0.09% of the dye mixture C | reddish-brown |
| 10 | 0.25% of the dye of formula (19)<br>0.03% of the dye of formula (15)<br>0.16% of the dye mixture A | olive |

EXAMPLE 11

When the procedure is carried out as described in Example 5 except that there is used, instead of 0.13% of the dye mixture B obtained according to Example 1b), 0.12% of the dye of the formula

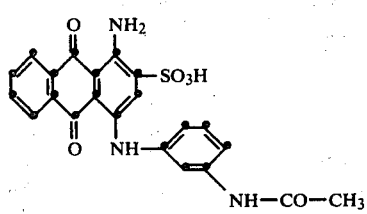

there is obtained, with otherwise the same procedure, a yarn dyed in a neutral brown shade.

By using, instead of 0.12% of the dye of the formula (13), the dyes given in the following Table 4, the dye of the formula (14) used therein having the following constitution:

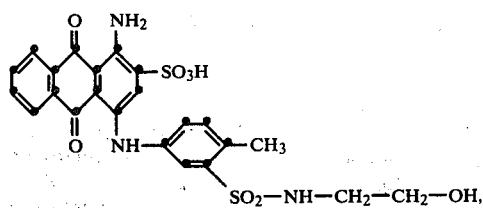

there is obtained the yarn dyed in the given shades.

TABLE 4

| Example | Dyes used | Shade |
|---|---|---|
| 12 | 0.18% of the dye of formula (18)<br>0.17% of the dye of formula (15)<br>0.06% of the dye of formula (13) | reddish-brown |
| 13 | 0.25% of the dye of formula (18)<br>0.036% of the dye of formula (15)<br>0.125% of the dye of formula (13) | olive |
| 14 | 0.27% of the dye of formula (18)<br>0.12% of the dye of formula (15)<br>0.12% of the dye of formula (14) | neutral brown |
| 15 | 0.18% of the dye of formula (18)<br>0.17% of the dye of formula (15)<br>0.06% of the dye of formula (14) | reddish-brown |
| 16 | 0.25% of the dye of formula (18)<br>0.036% of the dye of formula (15)<br>0.12% of the dye of formula (14) | olive |

EXAMPLE 17

500 m² of a polyamide(6.6) cut pile carpet (velvet pile material with polypropylene ribbon backing) having a weight per square meter of 535 g are continuously prewetted in a liquor containing per liter 1 g of the reaction product of 1 mol of nonylphenol and 9 mols of ethylene oxide, and the material is then subjected to suction to give a liquor absorption of 40 percent by weight.

In a frothing apparatus (mixer) there is produced from the following aqueous liquor a dye froth having a frothing degree of 1:10.

0.6 g/l of the dye of the formula

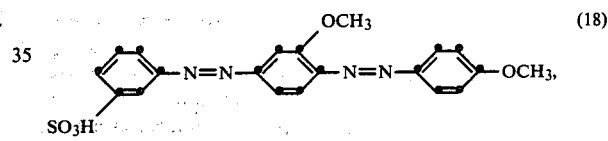

0.35 g/l of the dye of the formula

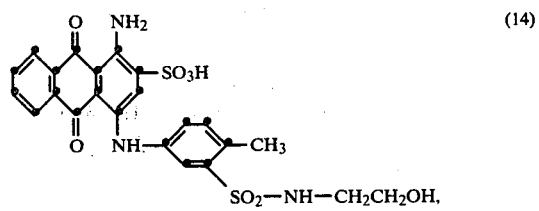

0.40 g/l of the dye of the formula

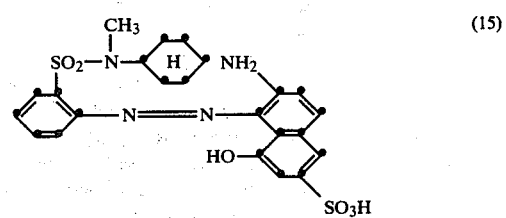

2.5 g of a foam-stabilising mixture of coconut fatty acid-diethanolamide/nonylphenolpolyglycol(11) ether and sodium lauryltriglycol ether sulfate per liter, 0.6 g of a siloxanoxyalkylene copolymer of the formula

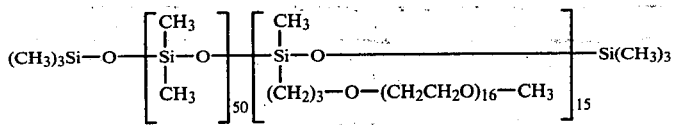

1 g of sodium acetate per liter, as well as acetic acid for adjusting the pH-value of the liquor to 6.0.

This forth is then applied from a froth container, which is provided with an adjustable doctor blade for obtaining the desired thickness of froth, by means of a chute onto the pile side of the carpet material passing through the dyeing plant (speed 9 m/minute). The coating thickness of froth is 8 mm, and the amount of froth applied is 135%. The carpet material subsequently passes through a vacuum passage in which, from the reverse side, the froth coating is partially sucked into the carpet (reduced pressure of 0.1 bar), in consequence of which the thickness of the froth layer is somewhat reduced. The carpet then passes over a transport roller into a steamer (102° C., saturated steam), where a slight foaming up and subsequent breaking down of the froth occurs. The carpet is afterwards sprayed with water at about 80° C.; it is then subjected to suction, and dried at 100° to 130° C. in a perforated cyclinder dryer. The carpet material obtained is levelly dyed in a beige shade; there is excellent dye penetration, and the softness and fluffiness of the material are favourably affected by the froth dyeing process.

EXAMPLE 18 (CARPET PRINTING)

A velvet pile carpeting piece made from polyamide 6 weighing 350 to 400 g/m² is impregnated, on a padding machine, with a padding liquor consisting of 988 parts of water, 10 parts of sodium hydroxide solution 36° Bé and 2 parts of a wetting agent, and the material is afterwards squeezed out to give a liquor absorption of 80%. There is then sprayed onto the pretreated carpet material, by means of a nozzle, in the form of a pattern a printing paste of the following composition:
942 parts of water,
50 parts of a thickener,
3 parts of an antifoaming agent,
3 parts of the yellow dye of the formula (18) of Example 2,
1 part of the red dye of the formula (15) of Example 2, and
1 part of the blue dye mixture A of Example 1.

The employed thickener has the following composition:
240 parts of white spirit,
50 parts of a water-in-oil emulsifier,
20 parts of an oil-in-water emulsifier,
20 parts of an antifoaming agent,
50 parts of a crosslinked carboxyvinyl polymer having a molecular weight of about 4,000,000,
70 parts of a linear carboxyvinyl polymer having a molecular weight of about 1,000,000, and
550 parts of water, the pH-value of which has been adjusted to 4.5 with acetic acid.

The material sprayed with printing ink is subsequently treated for 5 minutes with saturated steam at 101° C. to fix the dyes; it is then rinsed, neutralised, rinsed again and dried.

The velvet pile carpeting piece obtained displays a sharply outlined brown pattern which has very good penetration and shows no signs at all of "frosting".

EXAMPLE 19 (CARPET CONTINUOUS DYEING)

2.7 parts of the yellow dye of the formula (18) of Example 2, 1.2 parts of the red dye of the formula (15) of Example 2 and 1.3 parts of the blue dye mixture B of Example 1 are dissolved in 100 parts of water by brief boiling. This solution is then added to a solution containing 3 parts of a thickener based on locust bean flour, 5.0 parts of a coacervate-forming padding auxiliary based on a condensation product of a higher molecular fatty acid with an oxyalkylamine, 2.0 parts of cryst. monosodium phosphate and 1.0 part of cryst. disodium phosphate in 500 parts of cold water. The solution is subsequently made up with cold water to 1000 parts. Of this liquor having a pH-value of 5.5 to 6.5, 300%, relative to the weight of carpet, is applied to a polyamide-6,6 tufted crude carpet at a carpet speed of 8 meters per minute. The impregnated carpet passes into a loop steamer, where it is treated for 10 minutes with saturated steam at 98° to 100° C. The result after washing in a full width washing machine is a carpet material dyed in a neutral brown shade.

By using, instead of 2.7 parts of the yellow dye of the formula (18), 1.2 parts of the red dye of the formula (15) and 1.3 parts of the blue dye mixture B, the dyes and dye mixtures listed in the following Table 5, there are obtained carpets evenly dyed in the given shades.

TABLE 5

| Example | Dyes used | Shade |
|---|---|---|
| 20 | 2.4 parts of the dye of formula (18) | reddish-brown |
|  | 2.3 parts of the dye of formula (15) |  |
|  | 1.0 part of the dye mixture B |  |
| 21 | 3.0 parts of the dye of formula (18) | olive |
|  | 0.4 part of the dye of formula (15) |  |
|  | 1.2 parts of the dye mixture B |  |

EXAMPLE 22

10 parts of polyamide 6,6 yarn are dyed in 400 parts of an aqueous liquor containing per liter 1.5 g of ammonium acetate, the pH-value of the liquor having been adjusted to 5.5 with acetic acid. The dyes used are 0.27% of the dye of the formula (18), 0.12% of the dye of the formula

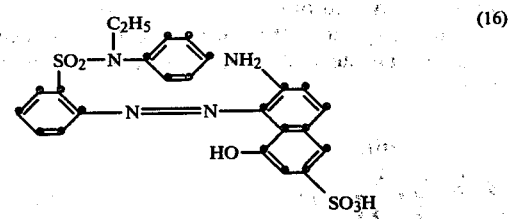

and 0.13% of the dye mixture B obtained according to Example 1b), the percentage amounts being relative to the weight of fibre. The dye bath is heated within 30 minutes to 98° C., and is held for 60 minutes at 96° to 98° C. The dyed yarn is subsequently removed, and is rinsed and dried in the customary manner. The result is yarn dyed in a neutral brown shade.

EXAMPLE 23 (WOOL CONTINUOUS DYEING)

A wool material is padded with a liquor containing 2.6 parts of the yellow dye of the formula (18), 5.2 parts of the red dye of the formula (15), 15.7 parts of the blue dye mixture B, 2.0 parts of a thickener based on alginate, 22.0 parts of a coacervate-forming padding auxiliary based on a condensation product of a higher molecular fatty acid with an oxyalkylamine, and 8.0 parts of 80% formic acid in 1000 parts of water, a liquor absorption of 85%, relative to the weight of wool being obtained. The material is subsequently steamed for 15 minutes in saturated steam at 98° to 100° C. and then washed. The result is a level olive dyeing

EXAMPLE 24

If the procedure is carried out as given in Example 5 except that there are used, in place of 0.13% of the dye mixture B obtained according to Example 1b), 0.13% of the dye mixture consisting of 52 parts of the dye of the formula

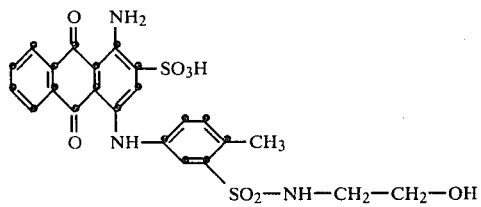

and 48 parts of the dye of the formula

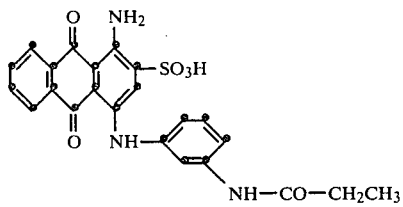

there is obtained a yarn dyed in a neutral brown shade.

What is claimed is:

1. A process for the trichromatic dyeing or printing of natural and synthetic polyamide materials with dye mixtures, in which process there is used a dye of the formula

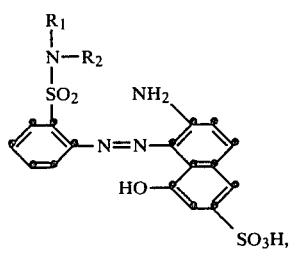

wherein $R_1$ is methyl or ethyl, and $R_2$ is cyclohexyl or phenyl, together with at least one dye of the formula

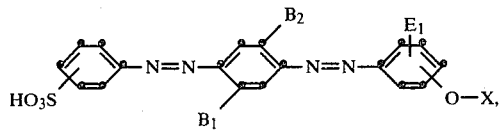

wherein $B_1$, $B_2$ and $E_1$ are hydrogen, $C_1$-$C_4$-alkyl or $C_1$-$C_4$-alkoxy, and X is straight-chain or branched-chain $C_1$-$C_4$-alkyl, or straight-chain or branched-chain $C_2$-$C_4$-hydroxyalkyl, and a dye of the formula

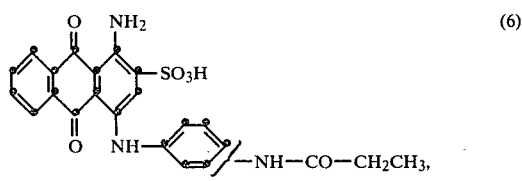

or with a mixture of the dyes of the formulae

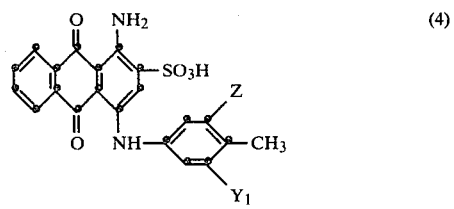

and

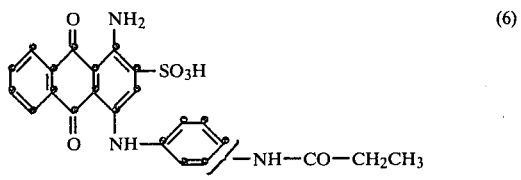

wherein $Y_1$ in the formula (4) is $C_2$-$C_4$-hydroxyalkylsulfamoyl, and Z is hydrogen or methyl, Z in the formula (4) being hydrogen when the propionylamino group in the formula (6) is bound in the m-position with respect to the NH group.

2. A process for the trichromatic dyeing or printing of natural and synthetic polyamide materials with dye mixtures, in which process there is used a dye of the formula

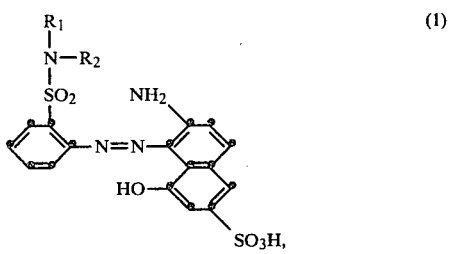

wherein $R_1$ is methyl or ethyl, and $R_2$ is cyclohexyl or phenyl, together with at least one dye of the formula

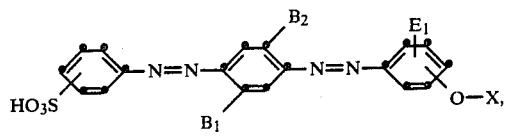 (2)

wherein $B_1$, $B_2$ and $E_1$ are hydrogen, $C_1$–$C_4$-alkyl or $C_1$–$C_4$-alkoxy, and X is straight-chain or branched-chain $C_1$–$C_4$-alkyl, or straight-chain or branched-chain $C_2$–$C_4$-hydroxyalkyl, and a dye of the formula

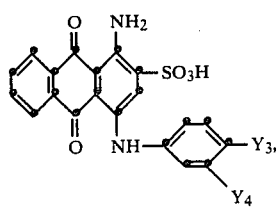 (7)

wherein $Y_3$ is hydrogen, and $Y_4$ is acetylamino, or wherein $Y_3$ is methyl, and $Y_4$ is $C_2$–$C_4$-hydroxyalkylsulfamoyl.

3. A process according to claim 1, wherein a dye of the formula (1) is used together with at least one dye of the formula (2) and with a dye mixture containing a dye of the formula

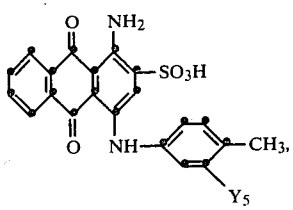 (8)

wherein $Y_5$ is a $C_2$–$C_4$-hydroxyalkylsulfamoyl group, and a dye of the formula

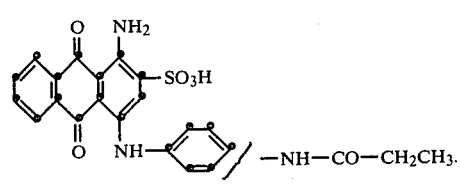 (6)

4. A process according to claim 1, wherein a dye of the formula (1) is used together with at least one dye of the formula (2) and with a dye mixture containing the dye of the formula

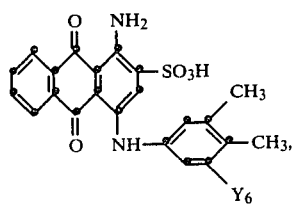 (9)

wherein $Y_6$ is a $C_2$–$C_4$-hydroxyalkylsulfamoyl group, and the dye of the formula

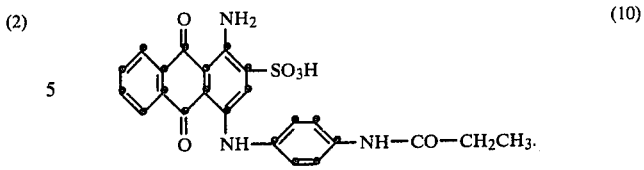 (10)

5. A process according to claim 4, wherein a dye of the formula (1) is used together with at least one dye of the formula (2) and with a dye mixture containing the dye of the formula

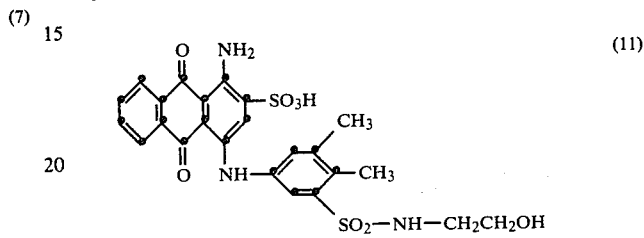 (11)

and the dye of the formula

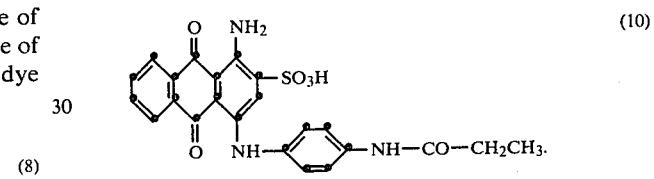 (10)

6. A process according to claim 5, wherein a dye of the formula (1) is used together with at least one dye of the formula (2) and with a dye mixture in which the ratio between the dyes of the formulae (11) and (10) is 60:40 to 40:60.

7. A process according to claim 1, wherein a dye of the formula (1) is used together with at least one dye of the formula (2) and with the dye of the formula

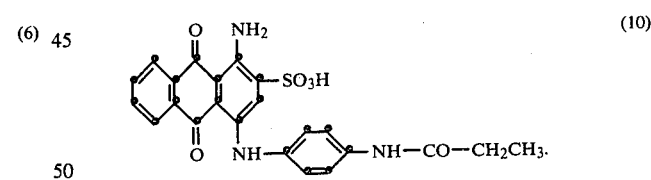 (10)

8. A process according to claim 1, wherein a dye of the formula (1) is used together with at least one dye of the formula (2) and with the dye of the formula

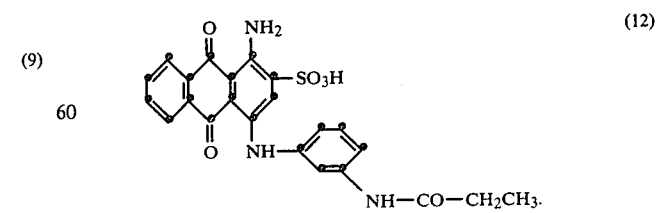 (12)

9. A process according to claim 2, wherein a dye of the formula (1) is used together with at least one dye of the formula (2) and with the dye of the formula

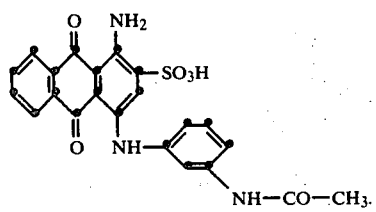

10. A process according to claim 2, wherein a dye of the formula (1) is used together with at least one dye of the formula (2) and with the dye of the formula

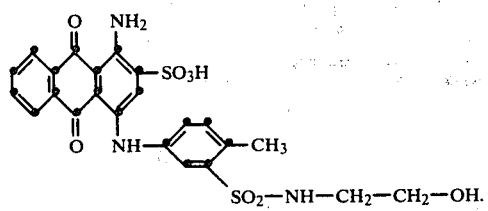

11. A process according to claim 1, wherein there is used, as dye of the formula (1) the dye of the formula

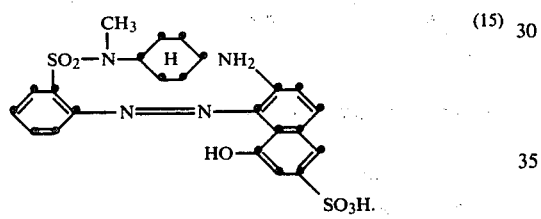

12. A process according to claim 1, wherein there is used, as dye of the formula (1), the dye of the formula

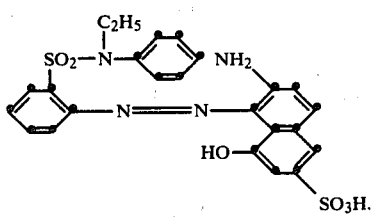

13. A process according to claim 6, wherein there is used, as dye of the formula (2), the dye of the formula

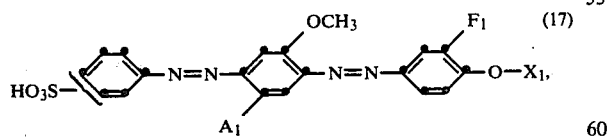

wherein $A_1$ is hydrogen or methyl, $F_1$ is hydrogen or methyl, and $X_1$ is methyl, ethyl, β-hydroxyethyl, β-hydroxypropyl, β-hydroxybutyl or α-ethyl-β-hydroxyethyl.

14. A process according to claim 13, wherein there is used the dye of the formula

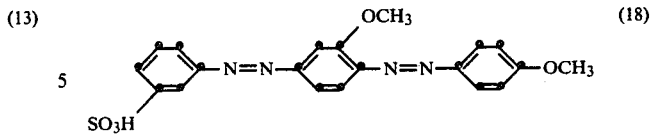

15. A process according to claim 13, wherein there is used the dye of the formula

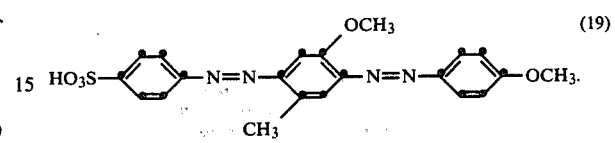

16. A process according to claim 5, wherein there is used, as dye of the formula (1), the dye of the formula

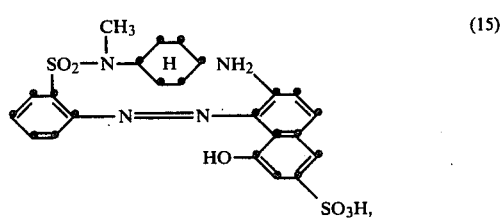

and, as dye of the formula (2), the dye of the formula

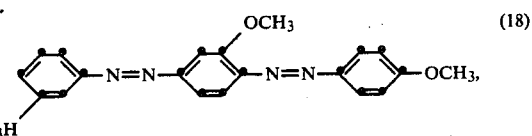

together with the dye mixture containing the dye of the formula

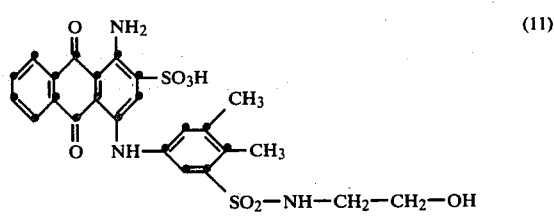

and the dye of the formula

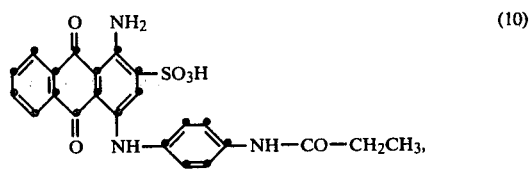

the ratio between the dyes of the formulae (11) and (10) being 60:40 to 40:60.

17. A process according to claim 3, wherein there is used, as dye of the formula (1), the dye of the formula

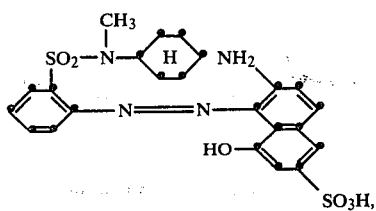

and, as dye of the formula (2), the dye of the formula

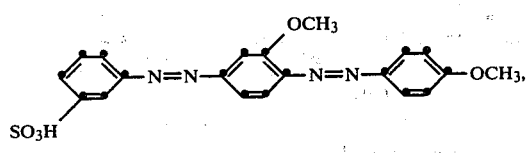

together with the dye mixture containing the dye of the formula

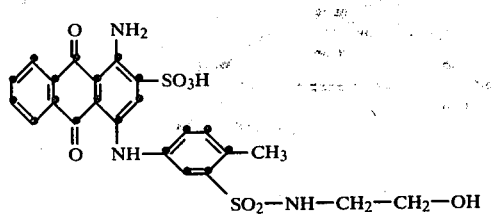

and the dye of the formula

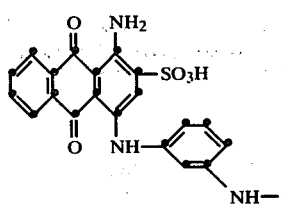

NH—CO—CH₂CH₃, the ratio between the dyes of the formulae (14) and (12) being 60:40 to 40:60.

18. A process according to claim 9, wherein there is used, as dye of the formula (1), the dye of the formula

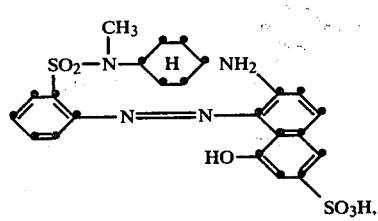

and, as dye of the formula (2), the dye of the formula

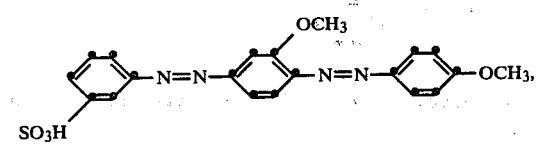

together with the dye of the formula

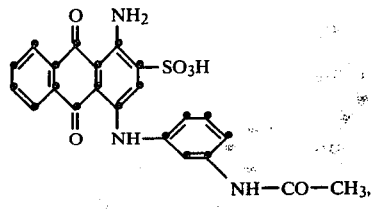

19. A process according to claim 10, wherein there is used, as dye of the formula (1), the dye of the formula

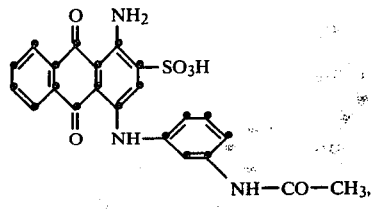

and, as dye of the formula (2), the dye of the formula

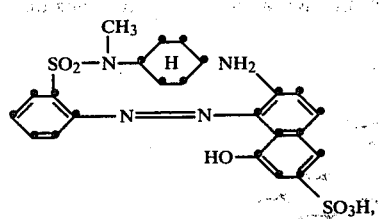

together with the dye of the formula

O NH₂ (14)
SO₃H
O NH—⌬—CH₃
SO₂—NH—CH₂—CH₂—OH.

20. A process according to claim 5, wherein there is used, as dye of the formula (1), the dye of the formula

(15) [structure]

and, as dye of the formula (2), the dye of the formula

HO₃S—⌬—N=N—⌬(OCH₃)—N=N—⌬—OCH₃, (19)
         CH₃ together with the dye mixture containing the dye of the formula

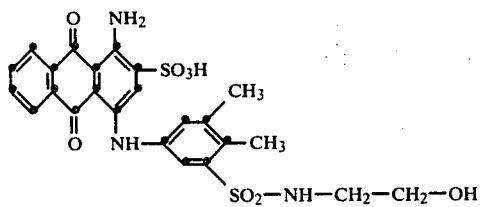

and the dye of the formula

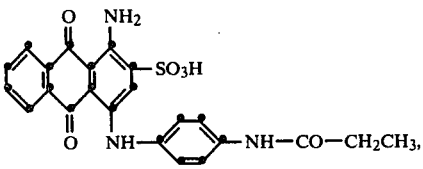

the ratio between the dyes of the formulae (11) and (10) being 60:40 to 40:60.

21. A process for the trichromatic dyeing or printing of materials made from natural and synthetic polyamide, wherein these materials are treated with a dye liquor or printing paste containing the dye mixture according to claim 1, together with water and optionally further additives.

22. An aqueous dye liquor or printing paste, which contains water, the dye mixture according to claim 1 and optionally further additives.

23. The polyamide material, dyed or printed by the process according to claim 21.

24. Polyamide carpet material, dyed or printed according to claim 23.

* * * * *